US011166327B1

(12) United States Patent
Kondeti et al.

(10) Patent No.: US 11,166,327 B1
(45) Date of Patent: Nov. 2, 2021

(54) SESSION INITIATED PROTOCOL (SIP) SESSION ESTABLISHMENT WITH A HOME SUBSCRIBER SERVER (HSS) OUTAGE

(71) Applicant: T-Mobile USA, Inc., Bellevue, WA (US)

(72) Inventors: Venkata Kondeti, Bellevue, WA (US); Karthik Chandrasekaran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/933,975

(22) Filed: Jul. 20, 2020

(51) Int. Cl.
*H04W 76/00* (2018.01)
*H04W 76/12* (2018.01)
*H04W 76/30* (2018.01)
*H04W 76/11* (2018.01)
*H04W 80/10* (2009.01)

(52) U.S. Cl.
CPC ............ *H04W 76/12* (2018.02); *H04W 76/11* (2018.02); *H04W 76/30* (2018.02); *H04W 80/10* (2013.01)

(58) Field of Classification Search
CPC ..... H04W 76/12; H04W 76/30; H04W 76/11; H04W 80/10; H04W 76/18; H04W 8/05; H04W 12/06
See application file for complete search history.

(56) References Cited

U.S. PATENT DOCUMENTS

| 2014/0018039 A1* | 1/2014 | Lau ........................ H04W 8/20 455/411 |
| 2014/0141743 A1* | 5/2014 | Shaw ................... H04W 12/069 455/405 |
| 2016/0345284 A1* | 11/2016 | Yared ................... H04L 65/1073 |
| 2017/0208462 A1* | 7/2017 | Zaifuddin ........... H04W 12/033 |

* cited by examiner

*Primary Examiner* — Lakeram Jangbahadur
(74) *Attorney, Agent, or Firm* — Lee & Hayes, P.C.

(57) ABSTRACT

Systems may establish a Session Initiated Protocol (SIP) session during a Home Subscriber Server (HSS) outage. The systems may include Network Functions (NF) that perform steps for establishing the SIP session and/or bypassing the HSS experiencing the outage. For instance, an Interrogating (I)-Call Session Control Function (CSCF) may modify a terminating message received from a User Equipment (UE) to generate a modified terminating message, and send one or more instances (e.g., forks) of the modified terminating message to one or more candidate Serving (S)-CSCFs. A particular S-CSCF of the candidate S-CSCFs may comprise the registered S-CSCF and may respond to an instance of the modified terminating message. In some embodiments, the I-CSCF may establish the SIP session by sending an instance of the modified terminating message to a designated S-CSCF. The designated S-CSCF may determine which candidate S-CSCF comprises the registered S-CSCF, for instance, by querying the candidate S-CSCFs.

20 Claims, 5 Drawing Sheets

SESSION INITIATED PROTOCOL (SIP) SESSION ESTABLISHMENT WITH A HOME SUBSCRIBER SERVER (HSS) OUTAGE

BACKGROUND

Telecommunication service providers operating 3rd Generation Partnership Program (3GPP) networks use multiple nodes for establishing and managing communication channels. In some instances, an outage at a node may result in failure for a device attempting to establish a communication channel via the node experiencing the outage. The device may be unable to establish a communication channel or receive other services over the network until the outage is resolved at the node, or until the node communications are redirected to a substitute node. In some instances, the outage may occur for several minutes as the network operators attempt to resolve the outage or reroute traffic.

Node outages are increasingly difficult to manage as new network generations are integrated into legacy systems, and new services and types of devices are added to the networks. Network providers may invest in techniques for overcoming outages and operating more reliable networks than competitors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Systems, methods, and apparatuses (hereinafter the "system") disclosed herein may perform techniques for establishing a communication session (e.g., the SIP session), for instance, via one or more Network Functions (NF)s of an IP Multimedia Subsystem (IMS) Core Network (e.g., a Long-Term Evolution (LTE) network). The system may include a Home Subscriber Server (HSS) outage at on HSS. The system may determine an occurrence of the HSS outage during a process for establishing the SIP session. The HSS may be unavailable to provide the I-CSCF with a Serving (S)-CSCF identifier corresponding to a registered S-CSCF to which a requesting User Equipment (UE) is registered. Upon determining the occurrence of he HSS outage, the system may perform steps for establishing the SIP session and/or bypassing the HSS.

In some embodiments, the I-CSCF may establish the SIP session by modifying a terminating (e.g., incoming) message received from the UE to generate a modified terminating message, and sending one or more instances (e.g., forks) of the modified terminating message to one or more candidate S-CSCFs. A particular S-CSCF of the candidate S-CSCFs may comprise the registered S-CSCF (e.g., the particular S-CSCF to which the UE registered). The registered S-CSCF may send a response to the instance of the modified terminating message, the response causing the SIP session to be established. One or more candidate S-CSCFs that receive one or more instances of the modified terminating message, but do not comprise the registered S-CSCF, may perform steps including ignoring the one or more instances of the modified terminating message based at least partly on determining a modified portion (e.g., a modified header or a modified body) of the modified terminating message.

In some embodiments, the I-CSCF may establish the SIP session by sending a first instance of the modified terminating message to a designated S-CSCF. The I-CSCF may determine or select the designated S-CSCF based on an S-CSCF identifier that may be stored at the I-CSCF indicating the designated S-CSCF. In some examples, alternatively, the I-CSCF may determine or select the designated S-CSCF based on a randomized selection process performed by the I-CSCF and/or one or more other NFs. In response to receiving the modified terminating message from the I-CSCF, the designated S-CSCF may determine which candidate S-CSCF comprises the registered S-CSCF. For instance, the designated S-CSCF may query one or more candidate S-CSCFs (e.g., to receive information about UEs registered to the one or more candidate S-CSCFs) and/or the designated S-CSCF may query an external data storage to determine which of the one or more candidate S-CSCFs comprises the registered S-CSCF. In some examples, the registered S-CSCF may send a second instance of the modified terminating message to a Telephony Application Server (TAS), for instance, to cause the TAS to determine the occurrence of the HSS outage and/or to cause the TAS to refrain from sending a message to the HSS experiencing the HSS outage.

In some examples, the systems and methods discussed herein may overcome the HSS outage, for instance, by bypassing the HSS experiencing the HSS outage. The systems and methods may establish the SIP session during the HSS outage, improving network reliability. Establishing the SIP session during the HSS outage may decrease network downtime, increase a traffic flow capacity of the network, and/or reduce computing resources of NFs for managing HSS outages (e.g., sending error messages, orchestrating multiple connection attempts, rerouting messages to other HSSs), such as reducing a processing requirement or a memory storage requirement of the NFs. Accordingly, the systems and methods discussed herein may result in technical improvements to a telecommunications network and the computing devices that comprise the telecommunications network.

Figure 1:
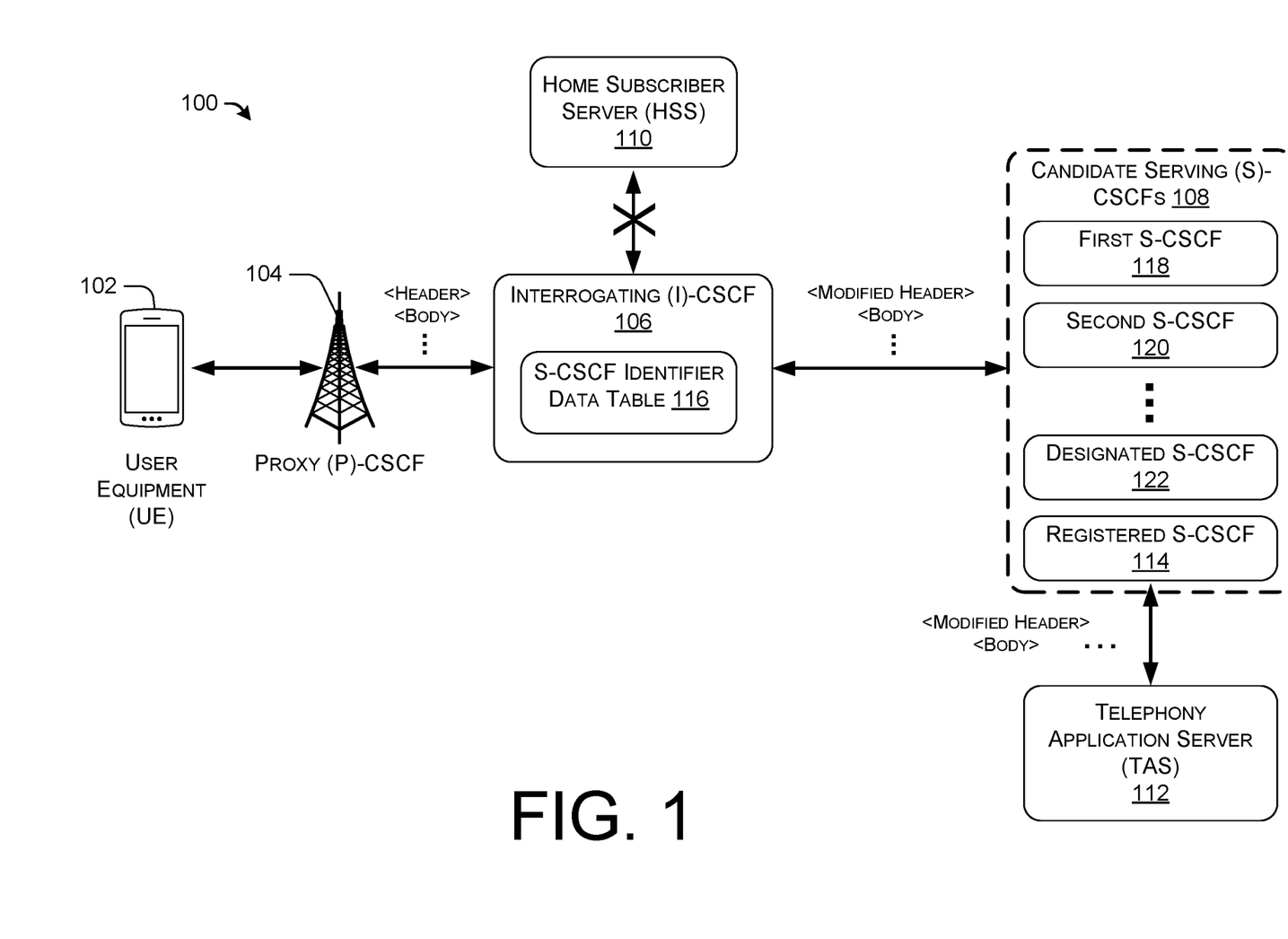
FIG. 1 depicts a schematic diagram of an example system for establishing a Session Initiated Protocol (SIP) session.

FIG. 1 depicts an example system 100 for establishing a SIP session. The system 100 may comprise a UE 102 and a plurality of NFs for receiving messages from the UE 102 and performing steps for establishing the SIP session for the UE 102. For instance, the system 100 may comprise one or more of a P-CSCF 104, an I-CSCF 106, a plurality of candidate S-CSCFs 108, an HSS 110, and/or a TAS 112, as discussed in greater detail below.

In some examples, the system 100 may comprise the UE 102. The UE 102 may comprise a device associated with a client, end-user, calling party, and/or a terminating device, such as a SIP-enabled handset. The UE 102 may comprise a computing device that communicates with other components (e.g., NFs) of the system 100, for instance, over a wired or wireless network. The UE 102 may comprise a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as non-mobile computing devices including, without limitation, a television (smart television), set-top-box (STB), desktop computer, and the like.

In some examples, the system 100 may comprise the P-CSCF 104. The P-CSCF 104 may comprise an access node for providing an IMS network entry point for the UE 102. The P-CSCF 104 may perform one or more validation, security, and/or authentication operations in response to receiving a terminating message from the UE 102. The P-CSCF 104 may route the terminating message to the I-CSCF 106.

In some examples, the system 100 may comprise the I-CSCF 106. The I-CSCF 106 may perform one or more operations for interrogating the HSS 110 to determine a S-CSCF identifier corresponding to a registered S-CSCF 114. In other words, the I-CSCF 106 may determine, via one or more messages sent to and from the HSS 110, to which of the plurality of candidate S-CSCFs 108 the UE 102 is registered (e.g., from a previously-performed registration process). The I-CSCF 106 may send or attempt to send one or more messages to the HSS 110 via a DIAMETER Cx interface and/or a Location Information Request (LIR) message. Determining the occurrence of the HSS outage may comprise determining an outage at the DIAMETER Cx interface.

In some examples, the HSS outage may occur at the HSS 110 before and/or while the I-CSCF 106 attempts to interrogate the HSS 110. Upon determining the occurrence of the HSS outage at the HSS 110, the I-CSCF 106 may perform one or more steps for establishing the SIP session by circumventing or bypassing the HSS 110 experiencing the outage. The I-CSCF 106 may establish the SIP session by modifying the terminating message to generate a modified terminating message. The I-CSCF 106 may determine the plurality of candidate S-CSCFs 108 from an S-CSCF identifier data table 116 or other data structure storing S-CSCF identifiers corresponding to the plurality of candidate S-CSCFs 108 and/or the registered S-CSCF 114. The I-CSCF 106 may store the S-CSCF identifier data table 116 and/or may access the S-CSCF identifier data table 116. The I-CSCF 106 may send multiple forked instances of the modified terminating message to the plurality of candidate S-CSCFs 108. For instance, the I-CSCF 106 may send a first instance of the modified terminating message to a first candidate S-CSCF 118, a second instance of the modified terminating message to a second candidate S-CSCF 120, and/or any number of instances of the modified terminating message to any number of the plurality of candidate S-CSCFs 108. The registered S-CSCF 114 may receive the modified terminating message and the SIP session may be established. Systems and methods for establishing the SIP session via the S-CSCF identifier data table 116 and/or sending forked instances of the modified message are discussed in greater detail below regarding FIGS. 2 and 4.

In some instances, the I-CSCF 106 may establish the SIP session by sending the first instance of the modified terminating message to a designated S-CSCF 122. The designated S-CSCF 122 may determine the occurrence of the HSS outage based on receiving the modified terminating message (or via communications with other NFs) and may determine the registered S-CSCF 114 from the plurality of candidate S-CSCFs 108. For instance, the designated S-CSCF 122 may send one or more queries requesting information from the plurality of candidate S-CSCFs 108 until the registered S-CSCF 114 is identified (e.g., by matching a first UE identifier and/or a first S-CSCF identifier from the modified terminating message with a second UE identifier and/or a second S-CSCF identifier received at the designated S-CSCF 122 from the plurality of candidate S-CSCFs. The designated S-CSCF 122 may, additionally or alternatively, determine the registered S-CSCF 114 via a query to an external storage device storing information indicating information about the UE 102 and/or the registered S-CSCF 114. Systems and methods for establishing the SIP session via the designated S-CSCF 122 are discussed in greater detail below regarding FIGS. 3 and 5.

In some examples, the I-CSCF 106 and/or other NFs (e.g., the P-CSCF 104, the plurality of candidate S-CSCFs 108 including the registered S-CSCF 114, the first candidate S-CSCF 118, the second candidate S-CSCF 120, and the designated S-CSCF 122, the HSS 110, and/or the TAS 112) may separately, or in combination, comprise one or more processors and one or more memory storage media that may store computer-readable instructions that, when executed by the one or more processors, cause the I-CSCF 106, the other NF, and/or the system 100 to perform the steps, acts, and operations discussed herein.

In some instances, the I-CSCF 106 may comprise the one or more processors, such as a microprocessor, a microcomputer, a microcontroller, a digital signal processor, a central processing unit (CPU), a graphics processing unit (GPU), and/or combinations thereof, etc. Among other capabilities, the one or more processors may operate to fetch and execute the computer-readable instructions (e.g., object code) stored in the one or more memory storage device 202 according to the operations disclosed herein.

In some instances, the I-CSCF 106 may comprise the one or more memory storage media, such as non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, combinations thereof, or any other medium that can be used to store information for access by an electronic computing device. Databases discussed herein, for instance stored at the one or more memory storage media, may include one or more of a comma delimited list, a spreadsheet, an array, a NoSQL data structure, a hash-based data structure, an object-based data structure, or any other data type, data structure, and/or data system for storing retrievable data.

In some examples, the system 100 may comprise the HSS 110. The HSS 110, when operating functionally and/or without the HSS outage, may store data indicating user profiles, such as a data structure storing information indicating subscriber data, service data, registration data, authentication data, and/or other data sent and retrieved at the HSS 110 by other control plane NFs. The HSS 110 may receive a request from the I-CSCF 106 for the S-CSCF identifier corresponding to the registered S-CSCF 114

(which may be stored at the HSS 110) and may provide or attempt to provide such information to the I-CSCF 106. However, in some instances, the HSS outage may occur at the HSS 110. For instance, the HSS 110 may fail to function properly, fail to receive the request, fail to receive or provide power to one or more HSS components, or may otherwise experience a hardware or software malfunction preventing the HSS 110 from sending the S-CSCF identifier corresponding to the registered S-CSCF 114 to the I-CSCF 106. Determining the HSS outage may comprise determining that the DIAMETER link between the HSS 110 and the I-CSCF 106 is down or unavailable.

In some examples, the system 100 may comprise the TAS 112. The TAS 112 may comprise an application server for providing telephony operations for the IMS network, such as one or more services related to call waiting, call holding, call forwarding, call transferring, call blocking, malicious caller identification, announcements, lawful interception, and/or conference calls. In some instances, the TAS 112 may communicate with the one or more candidate S-CSCFs 108, the registered S-CSCF 114, the HSS, any other NFs, and/or combinations thereof. In some instances, the system 100 may comprise another application server, such as a video application server, and/or a multimedia application server.

Figure 2:
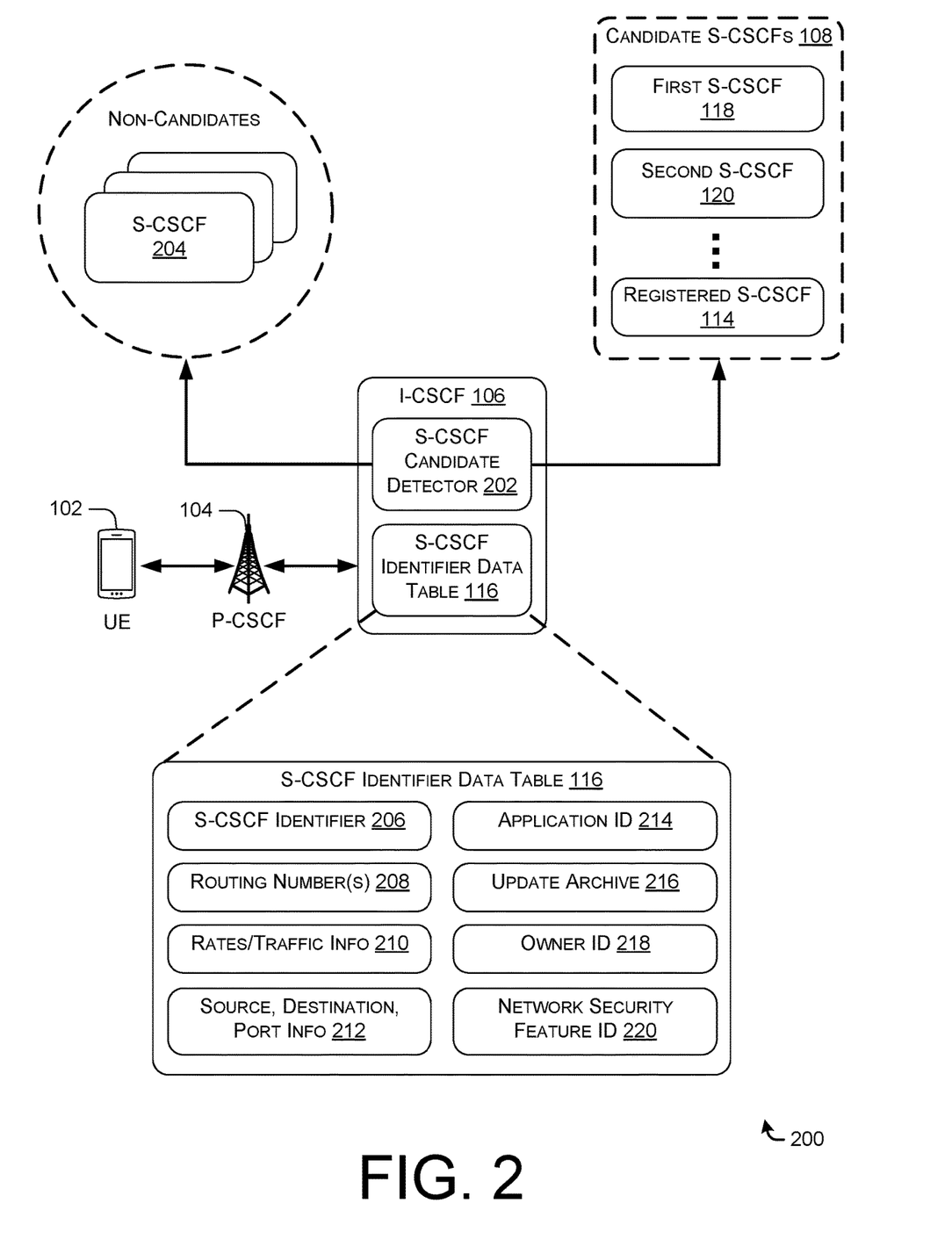
FIG. 2 depicts a schematic diagram of the example system for establishing the SIP session including a Serving (S)-Call Session Control Function (CSCF) identifier data table.

FIG. 2 depicts an example system 200 for establishing the SIP session. The system 200 may be similar to, identical to, or may form a portion of any of the systems discussed herein. The system 200 may perform techniques and methods to establish the SIP session via the I-CSCF 106 that communicates with, accesses, and/or stores the S-CSCF identifier data table 116.

In some examples, the system 200 may comprise the I-CSCF 106, which may include the S-CSCF identifier data table 116 and/or an S-CSCF candidate detector 202, which may be stored at a database associated with the I-CSCF 106.

In some examples, the S-CSCF candidate detector 202 may receive and/or determine data or information related to S-CSCFs on the network, such as the plurality of candidate S-CSCFs 108 and/or one or more non-candidate S-CSCFs 204. The S-CSCF candidate detector 202 may determine, based on the information, whether a particular S-CSCF (e.g., the first candidate S-CSCF 118, the second S-CSCF 120, the registered S-CSCF 114, etc.) qualifies as one of the candidate S-CSCFs 108 or one of the non-candidate S-CSCFs 204. For instance, the S-CSCF candidate detector 202 may determine whether the information related to a particular S-CSCF satisfies qualification parameters. The qualification parameters may comprise one or more thresholds (a model date, a install date, a processing capability value, a memory capacity value, a current traffic flow value, a maximum traffic capacity value, a current latency value, a maximum latency value, etc.), categories (e.g., a geographic region, a model, a device type, a manufacturer) binary "Y/N" or "0/1" characteristics (e.g., "active/inactive," "previously-accessed" or "not previously-accessed, etc.), and/or other characteristics (e.g., a security setting, an authentication posture, a power setting, etc.). In some examples, the information related to S-CSCFs, which may be compared to the qualification parameters, may be stored at the S-CSCF identifier data table 116, for instance, with an association to one or more S-CSCF identifier 206 (e.g., a particular S-CSCF identifier such as a hosting site identifier value) that may be received in a message with the information related to the S-CSCF.

In some examples, the I-CSCF 106 may include the S-CSCF identifier data table 116. The S-CSCF identifier data table 116 may store one or more S-CSCF identifiers 206 that may correspond to the one or more candidate S-CSCFs 108. In some examples, the S-CSCF identifier data table 116 may store one or more indicators that particular one or more UEs 102 are registered to particular one or more S-CSCFs, such as a first indicator that a first UE is registered to the first candidate S-CSCF 118, a second indicator that a second UE is registered to the second candidate S-CSCF 120, etc. In other words, the S-CSCF identifier data table 116 may store a list indicating which of the candidate S-CSCFs 108 comprises the registered S-CSCF 114 for the UE 102. Storing information associated with a particular S-CSCF identifier 206 at the S-CSCF identifier data table 116 may be based at least partly on a determination that the S-CSCF identifier 206 corresponds to a candidate S-CSCF 108 and/or not a non-candidate S-CSCF 204 (e.g., via the S-CSCF candidate detector 202).

In some examples, the S-CSCF identifier 206 may comprise a Fully Qualified Domain Name (FQDN), which may indicate a particular IP address and/or a particular port number associated with the registered S-CSCF 114. In some instances, the system 200 may add and/or remove one or more FQDNs from the S-CSCF identifier data table 116, for instance, based on information received at the I-CSCF 106 indicating a status and/or geographic information of one or more S-CSCFs corresponding to the one or more FQDNs (e.g., via the S-CSCF candidate detector 202).

In some examples, the S-CSCF identifier data table 116 may store the S-CSCF identifier 206 with an association to additional information for determining that the S-CSCF identifier 206 corresponds to the registered S-CSCF 114. For instance, the S-CSCF identifier data table 116 may store one or more of a routing number 208, rates or traffic information 210, source, destination, or port information 212, an application identifier 214, an update archive 216, an owner identifier 218, a network security feature identifier 220, and/or combinations thereof. In some examples, the I-CSCF 106 may receive and/or store the information at the S-CSCF identifier data table 116 according to periodic updates from other NFs, and/or during an initial registration process of the registered S-CSCF 114. The I-CSCF 106 may analyze the information stored at the S-CSCF identifier data table 116 to determine the S-CSCF identifier 206 corresponding to the terminating message sent from the UE 102.

In some instances, the I-CSCF 106 may generate one or more lists of the one or more candidate S-CSCFs 108 to store at the S-CSCF identifier data table 116. For instance, the I-CSCF 106 may generate a list of a sub-group of the one or more candidate S-CSCFs 108 based on one or more physical or geographical locations associated with subgroup. The one or more physical or geographical locations may be within a predetermined distance of a location associated with the UE (e.g., which may be determined from the terminating message). Accordingly, the I-CSCF 106 may determine the registered S-CSCF 114 from the list of the sub-group which may, in some instances, reduce a processing requirement of the system 200 by reducing a number of S-CSCF identifiers 206 to be analyzed.

In some examples, the I-CSCF 106 may determine the S-CSCF identifier 206 corresponding to the registered S-CSCF 114 from the S-CSCF identifier data table 116. Upon determining the S-CSCF identifier 206 corresponding to the registered S-CSCF 114, the system may (i) modify the terminating to generate the modified terminating message (e.g., by modifying a header of the terminating message); (ii) and/or send the modified terminating message to the registered S-CSCF 114. As such, the system 200 may establish the SIP session for the UE 102 and the registered S-CSCF 114 by accessing, receiving, or otherwise determining information stored at the S-CSCF identifier data table 116 of the I-CSCF 106.

Figure 3:
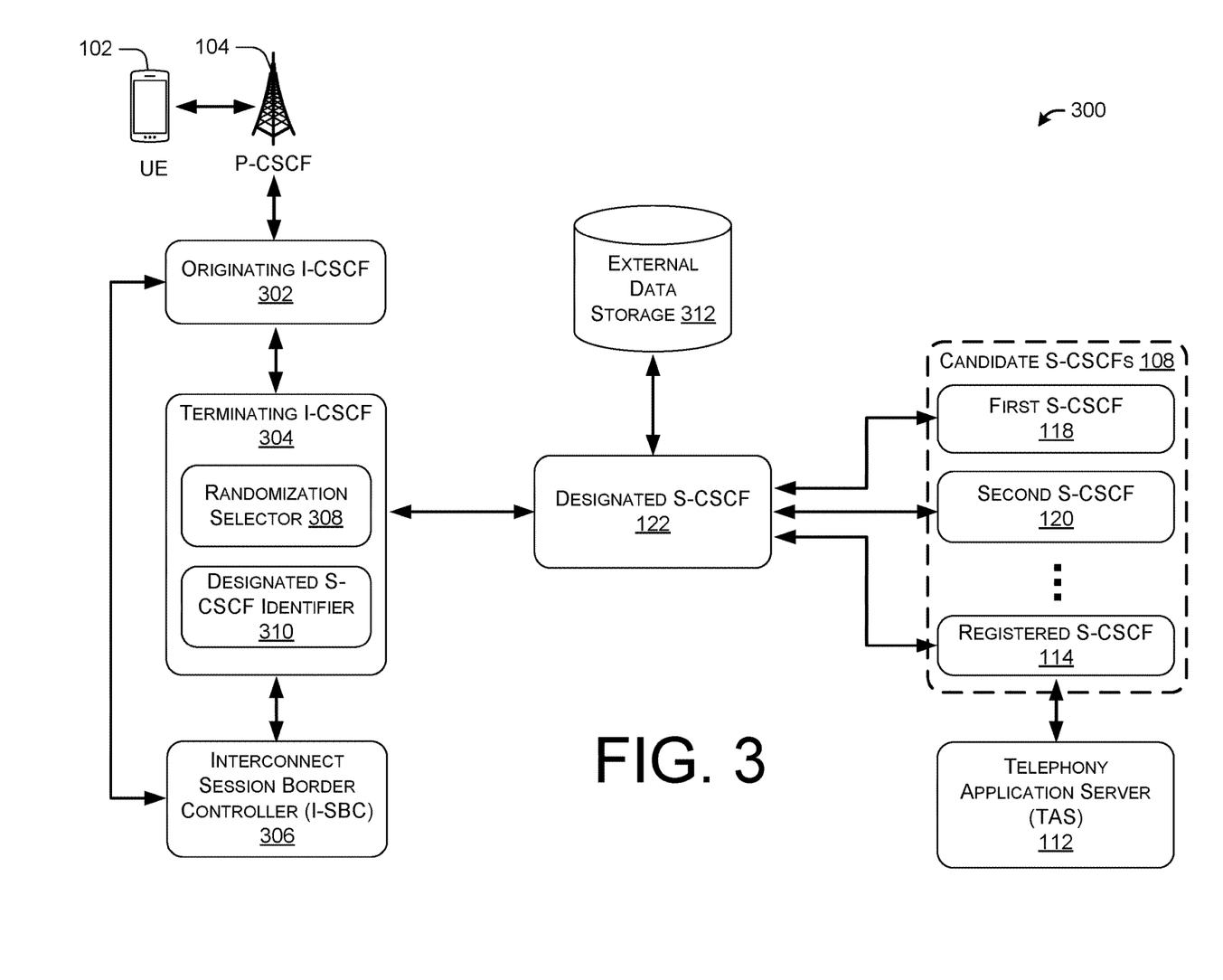
FIG. 3 depicts a schematic diagram of the example system for establishing the SIP session including a designated S-CSCF.

FIG. 3 depicts an example system 300 for establishing the SIP session. The system 300 may be similar to, identical to, or may form a portion of any of the systems discussed herein. The system 300 may perform methods or techniques to establish the SIP session by determining the registered S-CSCF 114 with the designated S-CSCF 122.

In some examples, the system 300 may comprise the I-CSCF 106 which may comprise an originating I-CSCF 302, a terminating I-CSCF 304, and/or the originating I-CSCF 302 in communication with terminating I-CSCF 304. The originating I-CSCF 302 may receive the terminating message from the P-CSCF 104 and may forward the terminating message to the terminating I-CSCF 304. Any of the operations or steps discussed herein as being performed by the I-CSCF 106 may be performed, more specifically, by the terminating I-CSCF 304.

In some examples, the originating I-CSCF 302 and the terminating I-CSCF 304 may communicate directly, for instance, where the originating I-CSCF 302 and the terminating I-CSCF 304 comprise part of a same network provided by a single service provider. In some examples, the originating I-CSCF 302 may comprise part of a first network of a first network provider and the terminating I-CSCF 304 may comprise part of a second network that is a different network than the first network. In such examples, an Interconnect-Session Border Controller (I-SBC) 306 may receive the terminating message from the originating I-CSCF 302. The I-SBC 306 may perform one or more operations related to formatting the terminating message, a security setting associated with the terminating message, a Quality of Service policy, a regulatory requirement, network connectivity, and/or billing. Upon receiving the terminating message from the originating I-CSCF 302, the I-SBC 306 may send the terminating message to the terminating I-CSCF 304.

In some examples, the terminating I-CSCF 304 which may comprise a randomization selector 308 for selecting the designated S-CSCF 122, and/or a designated S-CSCF identifier 310 corresponding to the designated S-CSCF 122.

In some examples, the I-CSCF 106 may determine to send an instance (e.g., copy) of the modified terminating message to the designated S-CSCF 122 at least partly in response to receiving the terminating message. The I-CSCF 106 may determine which S-CSCF of the one or more candidate S-CSCFs 108 (and/or the non-candidate S-CSCFs 204) comprises the designated S-CSCF 122. For instance, the I-CSCF 106 may store and/or receive the designated S-CSCF identifier 310, such us during an S-CSCF designation process prior to the system 300 receiving the terminating message. Additionally, or alternatively, the I-CSCF 106 may determine the designated S-CSCF 122 via the randomization selector 304 (e.g., via randomly selecting the designated S-CSCF 122 from a list of potential designated S-CSCFs). For instance, the I-CSCF 106 may attempt to send the modified terminating message to the designated S-CSCF 122 based on the stored designated S-CSCF identifier 310. The I-CSCF 106 may receive a response indicating that the attempt was at least partly unsuccessful and, in response, may send the instance of the modified request to the designated S-CSCF 122 via the randomization selector 308 (which may be a different designated S-CSCF than that corresponding to the stored designated S-CSCF identifier 310)

In some examples, the designated S-CSCF 122 may, at least partly in response to receiving the first modified terminating message from the I-CSCF 106, determine the registered S-CSCF 114 and/or send a second instance of the modified terminating message (e.g., a second copy of the modified terminating message) to the registered S-CSCF 114. For instance, the designated S-CSCF 122 may access and/or receive information from a list of the one or more candidate S-CSCFs 108 and may send one or more queries to the one or more candidate S-CSCFs 108. In response, the one or more candidate S-CSCFs 108 may send information to the designated S-CSCF 122 indicating whether the one or more candidate S-CSCFs 108 comprise the registered S-CSCF 114.

In some examples, the designated S-CSCF 122 may determine the registered S-CSCF 114 at least partly based on information accessed and/or received from an external data storage 312. The external data storage 312 may comprise one or more memory storage devices that may be located at the designated S-CSCF 122 and/or remotely from the S-CSCF 122. The external data storage 312 may include any of the information related to the one or more candidate S-CSCFs 108 discussed above regarding the S-CSCF identifier data table 116. Upon determining the registered S-CSCF 114, the designated S-CSCF 122 may send a first instance of the modified terminating message to the registered S-CSCF 114. Additionally, or alternatively, the registered S-CSCF 114 may send a second instance of the modified terminating message to the TAS 112, such that the TAS 112 may store and/or access an indication of the HSS outage, and/or avoid or omit sending one or more messages to the HSS 110.

Figure 4:
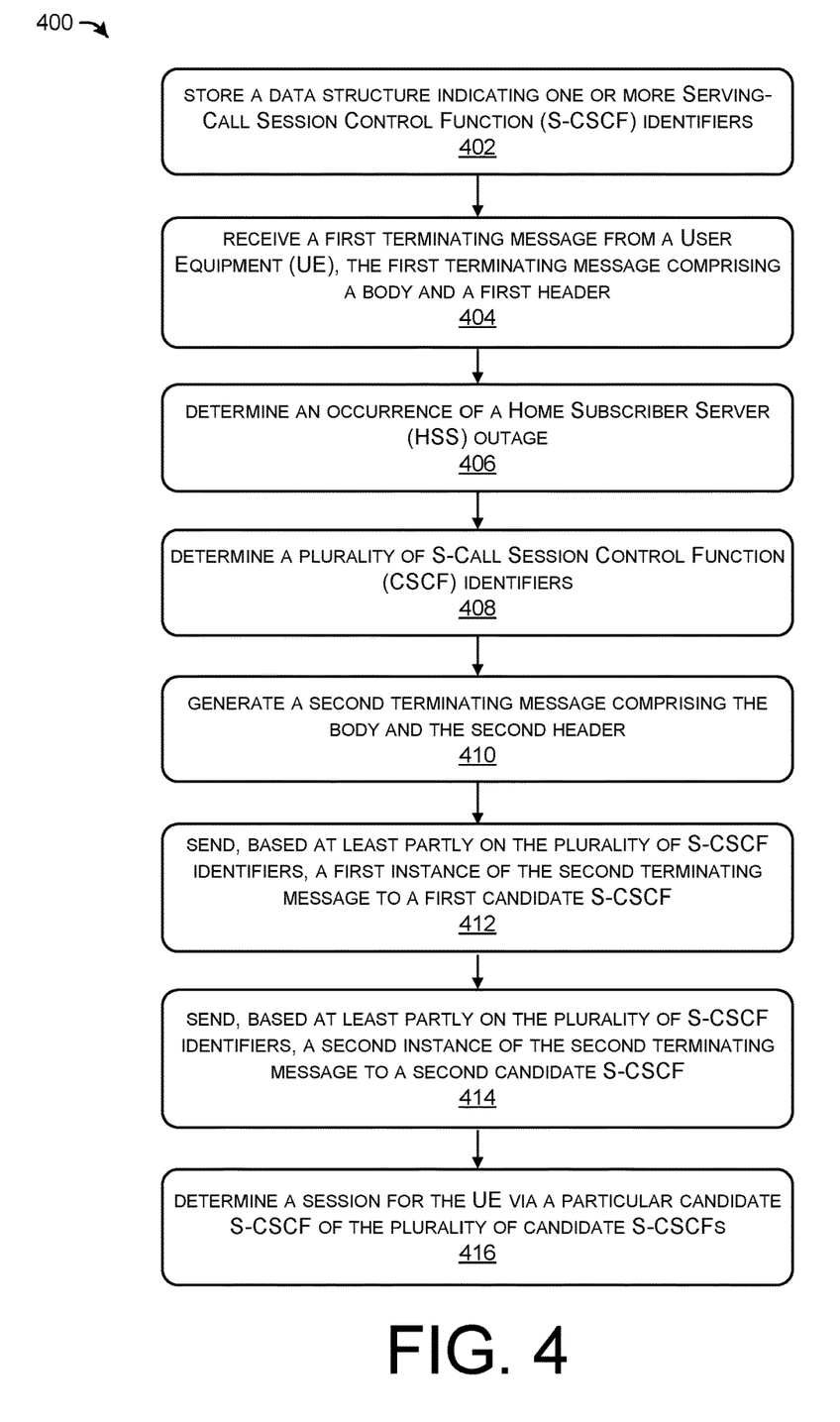
FIG. 4 depicts an example flow diagram illustrating a method for establishing the SIP session with the S-CSCF identifier data table.

FIG. 4 depicts a flow chart of an example method 400 that may be performed by any of the systems discussed herein, although system 100 is discussed by way example merely for convenience. The method 400 may include techniques performed by the system 100 for establishing the SIP session via the S-CSCF identifier data table 116.

At step 402, the system 100 may store a data structure (e.g., a data table) indicating one or more S-CSCF identifiers. For instance, the system 100 may store the S-CSCF identifier data table 116, such as at one or more memory storage devices at or otherwise associated with the I-CSCF 106. The S-CSCF identifier data table 116 may include information related to the one or more candidate S-CSCFs 108 indicating which UEs 102 are registered to which of the one or more candidate S-CSFs 108. In other words, the S-CSCF identifier data table 116 may include information for identifying the registered S-CSCF 114. The S-CSCF identifier data table 116 may comprise one or more of the S-CSCF identifier 206, the routing number 208, the rates or traffic information 210, the source, destination, or port information 212, the application identifier 214, the update archive 216, the owner identifier 218, the network security feature identifier 220, and/or combinations thereof.

At step 404, the system 100 may receive a first terminating message from the UE 102, the first terminating message comprising a body and a first header. For example, the first terminating message may comprise a request to establish the SIP session for the UE 102 with the registered S-CSCF 114. The first terminating message may include information related to the UE 102, the SIP session, and/or the registered S-CSCF 114 (e.g., a UE 102 identifier, etc.). In some examples, the first terminating message may comprise a register request for establishing a voice communication and/or a multimedia session on an LTE network.

At step 406, the system 100 may determine the occurrence of the HSS outage. For instance, upon receiving the first terminating message from the UE 102, the I-CSCF 106 may send the LIR to the HSS 110. The LIR may comprise a request for a particular S-CSCF identifier 206 associated with the registered S-CSCF 114 and/or the UE 102. In some instances, the system 100 may determine whether a response to the LIR is received at the I-CSCF 106 within a predetermined amount of time after sending the LIR (e.g., one second, two second, three second, five seconds, 10 seconds, 30 seconds, one minute, 2 minutes, five minutes, etc.). Upon determining that the predetermined amount of time has lapsed and/or no response has been received from the HSS 110 within the predetermined amount of time, the I-CSCF 106 may determine the occurrence of the HSS outage. In some examples, I-CSCF 106 may determine the occurrence of the HSS outage based on one or more messages indicating the HSS outage received from other NFs and/or sent to the I-CSCF 106 (e.g., error messages).

At step 408, the system 100 may determine a plurality of S-CSCF identifiers 206. For instance, the I-CSCF 106 may receive one or more of the plurality of S-CSCF identifiers 206 from the S-CSCF identifier data table 116 or other data structure storing S-CSCF identifiers 206 corresponding to the plurality of candidate S-CSCFs 108. The S-CSCF identifier data table 116 may include information related to one or more of the plurality of candidate S-CSCFs 108, such as the S-CSCF identifier 206, the routing number 208, the rates or traffic information 210, the source, destination, or port information 212, the application identifier 214, the update archive 216, the owner identifier 218, the network security feature identifier 220, and/or combinations thereof. In some instances, one or more S-CSCF identifier(s) 206 may comprise a Fully Qualified Domain Name (FQDN), which may indicate one or more particular IP addresses and/or one or more particular port numbers.

At step 410, the system 100 may generate a second terminating message comprising the body and the second header. For instance, the I-CSCF 106 may generate the second terminating message by generating the second header for the second terminating message as a modified version of the first header (e.g., a modified header). For instance, the I-CSCF 106 may insert a value (e.g., an alphanumeric value or string) into the first header of the first terminating message to generate the second header which, according to one or more configurations at NF(s) receiving the second terminating message, indicates the HSS outage (e.g., may include an HSS identifier corresponding to the HSS 110 experiencing the HSS outage). In some examples, the indication of the HSS outage may be included in the body of the second terminating message (e.g., to generate a modified body) in addition to or alternatively to in the second header. In some instances, the first terminating message may comprise an INVITE query, and the second terminating message or modified message may comprise a modified INVITE query corresponding to the INVITE query. In some examples, the modified, second terminating message (e.g., the modified INVITE query) may include the HSS identifier indicating the particular HSS 110 experiencing the HSS outage. For instance, the I-CSCF 106 may insert an alphanumeric string into the header of the first terminating message to generate the second header of the second terminating message, the alphanumeric string representing the HSS identifier.

At step 412, the system 100 may send, based at least partly on the plurality of S-CSCF identifiers 206, a first instance of the second terminating message to the first candidate S-CSCF 118. For example, the I-CSCF 106 may generate the first instance, or forked copy, of the second terminating message, and may send the first instance of the second terminating message to the first candidate S-CSCF 118 based at least partly on the S-CSCF identifier 206 at the S-CSCF identifier data table 116.

At step 414, the system 100 may send, based at least partly on one or more S-CSCF identifiers 206, a second instance of the second terminating message to the second candidate S-CSCF 120. For instance, rather than wait to be assigned to a new HSS, or for the HSS outage to end, the I-CSCF 106 may send multiple copies of the second terminating message (e.g., forked messages) to multiple candidate S-CSCFs 108 based on the S-CSCF identifier data table 116 of the I-CSCF 106 indicating the one or more candidate S-CSCFs 108. In some examples, the I-CSCF 106 may continue to send multiple instances of the second terminating message to the candidate S-CSCFs 108 until a response is received from the registered S-CSCF 114.

At step 416, the system 100 may determine a session for the UE via a particular candidate S-CSCF of the plurality of candidate S-CSCFs. For instance, the registered S-CSCF 114 may respond to one of the instances of the modified, second terminating message sent from the I-CSCF 106. The registered S-CSCF 114 may determine that the second terminating message sent from the I-CSCF 106 corresponds to the first terminating message sent from the UE 102 and may establish the SIP session for the UE 102. In some examples, one or more candidate S-CSCFs 108 (e.g., the first 5-candidate CSCF 118, the second candidate S-CSCF 120, etc.) may determine to ignore the instance(s) of the second terminating message and/or refrain from sending a response based on determining that the second terminating message comprises a modified message, based on the modified header of the second terminating message, based on a modified body of the second terminating message, and/or based on determining that the particular S-CSCF does not comprise the registered S-CSCF 114.

Figure 5:
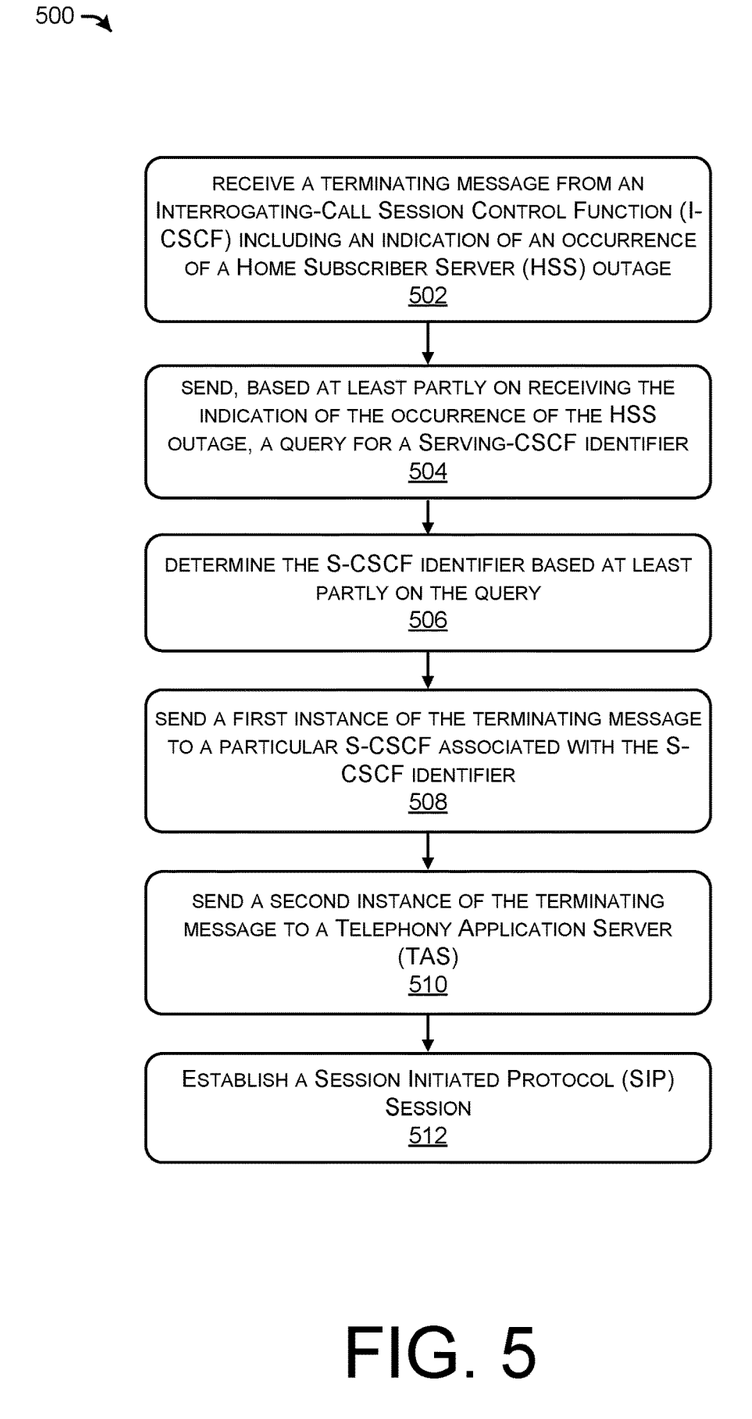
FIG. 5 depicts an example flow diagram illustrating a method for establishing the SIP session with the designated S-CSCF.

FIG. 5 depicts a flow chart of an example method 500 that may be performed by any of the systems discussed herein, although system 100 is discussed by way example merely for convenience. The method 500 may include techniques performed by the system 100 for establishing the SIP session via the designated S-CSCF 122.

At step 502, the system 100 may receive a terminating message from the I-CSCF 106 including the indication of the occurrence of an HSS outage. For instance, the designated S-CSCF 122 may receive an instance of a modified terminating message from the I-CSCF 106. The I-CSCF 106 may insert a value (e.g., an alphanumeric value or string) into the first header of the first terminating message to generate the second header which may indicate the HSS outage (e.g., may include an HSS identifier corresponding to the HSS 110 experiencing the HSS outage). In some examples, the indication of the HSS outage may be included in the body of the modified terminating message (e.g., to generate a modified body) in addition to or alternatively to in the second header. The modified terminating message may comprise a modified INVITE query.

At step 504, the system 100 may send, based at least partly on receiving the indication of the occurrence of the HSS outage, a query for a particular S-CSCF identifier 206. For instance, the designated S-CSCF 122 may send one or more queries to determine the particular S-CSCF identifier 206 corresponding to the registered S-CSCF 114. The designated S-CSCF 122 may access and/or receive information from a list of the one or more candidate S-CSCFs 108 and may send one or more queries to the one or more candidate S-CSCFs 108. In response, the one or more candidate S-CSCFs 108 may send information to the designated S-CSCF 122 indicating whether the one or more candidate S-CSCFs 108 comprise the registered S-CSCF 114.

At step 506, the system 100 may determine the S-CSCF identifier 206 based at least partly on the query sent from the designated S-CSCF 122. For instance, one of the plurality of candidate S-CSCFs 108 (e.g., the registered S-CSCF 114) may respond to the query with a message including the S-CSCF identifier 206 and/or an indication that the S-CSCF identifier 206 corresponds to the registered S-CSCF 114. Additionally, or alternative, the designated S-CSCF 122 may receive the S-CSCF identifier 206 corresponding to the registered S-CSCF 114 from the external data storage 312, which may respond to the query.

At step 508, the system 100 may send a second instance of the modified terminating message received from the I-CSCF 106 to a particular S-CSCF associated with the S-CSCF identifier 206. For instance, the designated S-CSCF 122 may generate and/or send the second instance of the modified terminating message to the registered S-CSCF 114 corresponding to the S-CSCF identifier 206.

At step 510, the system 100 may send a third instance of the terminating message to a Telephony Application Server (TAS) 112. For instance, the registered S-CSCF 114 may send a third instance of the modified INVITE query to the TAS 112. Upon receiving the third instance of the terminating message (e.g., the modified INVITE query), the TAS 112 may determine whether to send a TAS message to the HSS 110. For instance, the TAS 112 may determine the occurrence of the HSS outage based at least partly on a modification included in a header of the third instance of the terminating message. Accordingly, the TAS 112 may determine to refrain from sending one or more TAS messages, such as one or more Circuit Switch Routing Numbers (CSRN)s to the HSS 110 corresponding to the HSS outage (e.g., based on an HSS identifier included in the modified INVITE query).

At step 512, the system 100 may establish the SIP session. For instance, upon receiving the second instance of the terminating message from the designated S-CSCF 122, the registered S-CSCF 114 may respond by sending one or more session-initiation messages to other control plane NFs of the network, establishing the SIP session for the UE 102.

Although FIGS. 4 and 5 illustrate example operations, the described operations in these figures (and all other methods and operations disclosed herein) may be performed in other orders different than those illustrated in FIGS. 4 and 5 and multiple steps may be performed simultaneously or in parallel. Furthermore, in some embodiments, one or more operations illustrated in FIGS. 4 and 5 may be omitted, repeated, and/or combined with other operations illustrated in FIGS. 4 and 5, or any other operations and components discussed in this disclosure. In some instances, any of the steps 402-416 or 502-512 may be performed at least partly in response to any other of the steps 402-416 or 502-512. In some instances, the operations illustrated in FIGS. 4 and 5 may be performed in multiple iterations for instance, to establish thousands, or even millions of SIP sessions which may experience an HSS outage.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A device comprising:
one or more processors; and
one or more computer-readable media storing instructions that, when executed by the one or more processors, cause the device to:
  receive a terminating message from an Interrogating (I)-Call Session Control Function (CSCF) including an indication of an occurrence of a Home Subscriber Server (HSS) outage, the terminating message including an HSS identifier corresponding to the indication of the occurrence of the HSS outage;
  send, based at least partly on the indication of the occurrence of the HSS outage, a request for a Serving (S)-CSCF identifier corresponding to the terminating message;
  receive a particular S-CSCF identifier at least partly in response to the request;
  generate a modified terminating message from the terminating message;
  send a first instance of the modified terminating message to a particular S-CSCF associated with the particular S-CSCF identifier;
  modify an INVITE query to generate a modified INVITE query that includes the HSS identifier; and
  send a second instance of the modified terminating message to a Telephony Application Server (TAS), the second instance of the modified terminating message including the modified INVITE query.

2. The device of claim 1, wherein the device comprises an S-CSCF and sending the request for the S-CSCF identifier comprises at least one of:
  sending a plurality of instances of the request to a plurality of candidate S-CSCFs; and
  sending a query to a database storing state information related to the plurality of candidate S-CSCFs.

3. The device of claim 1, wherein the terminating message comprises a request to establish a voice communication session on a Long-Term Evolution (LTE) network.

4. The device of claim 1, wherein the instructions, when executed by the one or more processors, further cause the device to determine the particular S-CSCF from a plurality of candidate S-CSCFs according to a randomized selection by the I-CSCF.

5. The device of claim 4, wherein the instructions, when executed by the one or more processors, further cause the device to determine the plurality of candidate S-CSCFs based at least partly on a geographic region associated with the plurality of candidate S-CSCFs.

6. The device of claim 4, wherein the instructions, when executed by the one or more processors, further cause the device to determine the plurality of candidate S-CSCFs based at least partly on a security setting associated with the plurality of candidate S-CSCFs.

7. The device of claim 4, wherein the instructions, when executed by the one or more processors, further cause the device to determine the plurality of candidate S-CSCFs based at least partly on a traffic load associated with plurality of candidate S-CSCFs.

8. A system comprising:
one or more processors; and
one or more computer-readable media storing instructions that, when executed by the one or more processors, cause the system to:
  receive a terminating message from an Interrogating (I)-Call Session Control Function (CSCF) including an indication of an occurrence of a Home Subscriber Server (HSS) outage, the terminating message including an HSS identifier corresponding to the indication of the occurrence of the HSS outage;

send a query for a Serving (S)-CSCF identifier;

receive a particular S-CSCF identifier at least partly in response to the query;

generate a modified terminating message from the terminating message;

send a first instance of the modified terminating message to a particular S-CSCF associated with the particular S-CSCF identifier;

modify an INVITE query to generate a modified INVITE query that includes the HSS identifier; and send a second instance of the modified terminating message to a Telephony Application Server (TAS), the second instance of the modified terminating message including the modified INVITE query.

9. The system of claim 8, wherein sending the query comprises determining the particular S-CSCF identifier from a plurality of candidate S-CSCF identifiers according to a randomized selection by the I-CSCF.

10. The system of claim 8, wherein the terminating message comprises a request to establish a multimedia communication on a Long-Term Evolution (LTE) network.

11. The system of claim 8, wherein the instructions, when executed by the one or more processors, further cause the system to:

determine, via the TAS, whether to send a TAS message to the HSS based at least partly on receiving the modified INVITE query.

12. The system of claim 11, wherein the TAS message comprises a request for a Circuit Switched Routing Number (CSRN).

13. The system of claim 8, wherein the instructions, when executed by the one or more processors, further cause the system to:

determine the particular S-CSCF from a plurality of candidate S-CSCFs; and determine the plurality of candidate S-CSCFs based at least partly on one or more of (i) a geographic region associated with the plurality of candidate S-CSCFs; (ii) a security setting associated with the plurality of candidate S-CSCFs; or (iii) a traffic load associated with plurality of candidate S-CSCFs.

14. A method comprising:

receive a terminating message from an Interrogating (I)-Call Session Control Function (CSCF) including an indication of an occurrence of a Home Subscriber Server (HSS) outage, the terminating message including an HSS identifier corresponding to the indication of the occurrence of the HSS outage;

send, based at least partly on receiving the indication of the occurrence of the HSS outage, a query for a Serving (S)-CSCF identifier;

determine the S-CSCF identifier based at least partly on the query;

generate a modified terminating message from the terminating message;

send a first instance of the modified terminating message to a particular S-CSCF associated with the S-CSCF identifier;

modify an INVITE query to generate a modified INVITE query that includes the HSS identifier; and send a second instance of the modified terminating message to a Telephony Application Server (TAS), the second instance of the modified terminating message including the modified INVITE query.

15. The method of claim 14, further comprising sending a Location Information Request (LIR) to the HSS;

and determining, at the I-CSCF, the occurrence of the HSS outage based at least partly on sending the LIR.

16. The method of claim 14, wherein the TAS determines whether to send a TAS message to the HSS based at least partly on the modified INVITE query.

17. The method of claim 16, wherein the TAS message comprises a request for a Circuit Switched Routing Number (CSRN).

18. The method of claim 14, further comprising selecting the particular S-CSCF from a plurality of candidate S-CSCFs according to a randomized selection by the I-CSCF.

19. The method of claim 18, further comprising determining the plurality of candidate S-CSCFs based on one or more of (i) a geographic region associated with the plurality of candidate S-CSCFs; (ii) a security setting associated with the plurality of candidate S-CSCFs; or (iii) a traffic load associated with plurality of candidate S-CSCFs.

20. The method of claim 14, wherein the terminating message comprises a request to establish a voice communication session on a Long-Term Evolution (LTE) network.

* * * * *